United States Patent [19]

Samples et al.

[11] Patent Number: 5,568,670
[45] Date of Patent: Oct. 29, 1996

[54] WIPER BLADE WITH WIRE ELASTIC RESPONSE MEMBER THEREIN

[76] Inventors: Timothy W. Samples, 4338 State St.; C. Robert Samples, 465 Barr Ct., both of Akron, Ohio 44319

[21] Appl. No.: 245,604

[22] Filed: May 20, 1994

Related U.S. Application Data

[63] Continuation-in-part of Ser. No. 905,839, Jun. 29, 1992, abandoned.

[51] Int. Cl.$^6$ ........................................ B60S 1/38
[52] U.S. Cl. ........................ 15/250.48; 15/250.361; 15/245
[58] Field of Search .................. 15/250.48, 245, 15/250.41, 256.51, 250.06, 250.09

[56] References Cited

U.S. PATENT DOCUMENTS

| | | | |
|---|---|---|---|
| 1,753,651 | 4/1930 | Gillet | 15/250.41 |
| 1,771,824 | 7/1930 | Storrie | 15/250.41 |
| 2,186,193 | 1/1940 | Christen | 15/250.40 |
| 2,324,365 | 7/1943 | Coutts | 15/250.41 |
| 2,656,448 | 10/1953 | Lentz | 15/250.06 |
| 2,797,428 | 7/1957 | Wallis | 15/250.36 |
| 2,975,459 | 3/1961 | Wojciechowski | 15/250.48 |
| 3,639,938 | 2/1972 | Golden | 15/250.06 |
| 3,718,940 | 3/1973 | Bode | 15/250.06 |
| 3,766,591 | 10/1973 | Soito | 15/245 |
| 3,936,901 | 2/1976 | Theckston | 15/250.06 |
| 4,669,144 | 6/1987 | Yasukawa et al. | 15/250.36 |

FOREIGN PATENT DOCUMENTS

| | | | |
|---|---|---|---|
| 820156 | 7/1937 | France | 15/250.06 |
| 533392 | 9/1955 | Italy | 15/250.36 |
| 749593 | 5/1956 | United Kingdom | 15/250.36 |

*Primary Examiner*—Gary K. Graham
*Attorney, Agent, or Firm*—Oldham & Oldham Co. LPA

[57] ABSTRACT

An improved windshield wiper blade insert for mounting on a wiper blade carrier arm comprises a base portion, a shank portion and a wiping portion. The shank portion comprises an elastic response enhancing material. The material is preferably a metal that exhibits substantially total elastic recovery under the flexural stress and service conditions encountered by the wiper blade insert. In one embodiment, the shank portion contains a ribbon of spring metal with a thickness in the range of about 0.001 to about 0.004 inches. In a second embodiment, the elastic response member is an essentially rectangular solid formed from spring metal wire with a diameter in the range of about 0.001 to about 0.006 inches.

10 Claims, 2 Drawing Sheets

WIPER BLADE WITH WIRE ELASTIC RESPONSE MEMBER THEREIN

This is a continuation-in-part of application (s) Ser. No. 07/905,839 filed on Jun. 29, 1992 now abandoned.

The present invention relates to an improved wiper blade insert for wiping the windshield of a vehicle such as an automobile. Particularly, the present invention relates to replacement or improvement of the essentially viscoelastic shank portion of the prior art wiper blade insert by a substantially elastic shank portion, especially a shank portion comprising a substantially elastic metal insert.

BACKGROUND ART

A major problem with wiper blade inserts manufactured from soft flexible rubber is that the rubber takes a permanent set during its service life and thereafter does not wipe properly. A wiper blade that is functioning properly flips over at the beginning of each stroke; thereby, the blade always wipes with the square cut end or lip of the blade trailing the wiper blade carrier arm. The large number of patent applications purporting to solve the problems of ineffective windshield wiping are evidence of the continuing search for a better solution.

At least five of the problems that we have identified with present wiper blade technology may be solved by the present invention. These problems are: 1) permanent set of the wiper blade; 2) slow elastic response of the blade; 3) ozone degradation; 4) solvent degradation; and 5) ultraviolet radiation degradation.

The permanent set reduces the blade's ability to return to its exact original position and prevents the blade from rapidly flipping, resulting in an unsatisfactory wipe. The permanent set occurs because the wiper blade is pressed against the windshield under the necessary pressure of the wiper blade carrier arm. When the blade is in this flexed position for a prolonged period at temperatures ranging from about −30° C. to about +130° C. with exposure to sunlight, ozone, rain water, salt water, acid rain, solvents in windshield wiper fluid, etc., the permanent set occurs along the relatively thin shank portion of the blade. Of particular interest are the solvents encountered in windshield wiper fluids and/or automotive environments that cause swelling of rubber, either natural or synthetic.

Another factor influencing wiper performance is the slow elastic response of a rubber of the type suitable as a wiping surface. In compounding a rubber that is suitable as a wiper blade, the rubber compounder necessarily compromises rubber properties to adjust the wiping capability and the elastic response, frequently with the preference being given to wiping capability, As described further below, the present invention seeks to solve these problems.

SUMMARY OF THE INVENTION

A first object of the invention is to provide a wiper blade insert that is able to effectively wipe moisture and debris off of a windshield while retaining fast elastic response and minimizing the amount of permanent set in the shank portion of the blade.

This and other objects of the invention are achieved by a wiper blade insert for mounting in a wiper blade carrier arm which comprises a base portion, a shank portion and a swinging and wiping portion. The base portion is used for attaching the wiper blade insert into the wiper blade carrier arm. The shank portion has a first and a second edge along the longitudinal axis thereof and incorporates an elastic response member to provide the shank portion with an elastic response frequency that is at least 1.2 times faster than that of natural rubber. The first edge of the shank portion is affixed to the base portion. The swinging and wiping portion comprises a flexible abrasion resistant vulcanized natural rubber material suitable for wiping. It is attached to the shank portion along the second edge of the shank portion.

The wiper blade insert has a shank portion that retains a permanent set of less than about nine degrees after being deflected to 45 degrees for 96 hours at a temperature of 70° C., and it preferably retains a set of less than about five degrees, and most preferably, of less than about one degree after being deflected to 45 degrees for 96 hours at a temperature of 70° C.

The wiper blade insert has a shank portion with an elastic response frequency that is substantially unaffected by temperature variation between −30° C. and +130° C.

In a first embodiment, the elastic response member is an elongate rectangular metal solid with a thickness in the range of about 0.001 to about 0.004 inches and a width in the range of about 0.20 to about 0.25 inches. The metal is selected from the group consisting of spring stainless steel, blue carbon steel, beryllium copper, monel, phosphor bronze, silicon bronze and spring grade brass, with a Rockwell hardness in the range of about 45 to about 55. Such a metal solid may be embedded in the rubber used in the swinging and wiping portion, but this is not required.

In a first species of a second embodiment, the shank portion comprises an elastic response member embedded in natural rubber. The elastic response member is formed by wrapping a length of wire around a mandrel to form a tight helical coil, securing adjacent loops of the coil by making an axial weld along the coil, removing the mandrel and flattening the coil axially to provide an essentially rectangular member. The preferred wire is a metal selected from the group consisting of stainless steel, blue carbon steel, beryllium copper, monel, phosphor bronze, silicon bronze and spring grade brass, with a Rockwell hardness in the range of about 45 to about 55. The preferred wire has a diameter in the range of about 0.001 to about 0.006 inches. The preferred mandrel size for forming the coil is about 0.20 to about 0.022 inches in diameter.

In a second species of the second embodiment, the shank portion is comprised of the elastic response member embedded in natural rubber, the elastic response member being formed by braiding at least three lengths of wire to form a flat elongate ribbon. Each of the lengths of wire is preferably a metal selected from the group consisting of spring stainless steel, blue carbon steel, beryllium copper, monel, phosphor bronze, silicon bronze and spring grade brass, with a Rockwell hardness in the range of about 45 to about 55. The preferred wire has a diameter in the range of about 0.001 to about 0.006 inches. In the preferred embodiment, the flat elongate ribbon of braided wire has a width in the range of about 0.20 to about 0.25 inches and a thickness in the range of about 0.002 to about 0.028 inches.

BRIEF DESCRIPTION OF THE DRAWINGS

Better understanding of the present invention will be attained by reference to the appended drawings, wherein identical reference numerals refer to identical parts, and wherein.

DESCRIPTION OF THE PREFERRED EMBODIMENT

Figure 1:
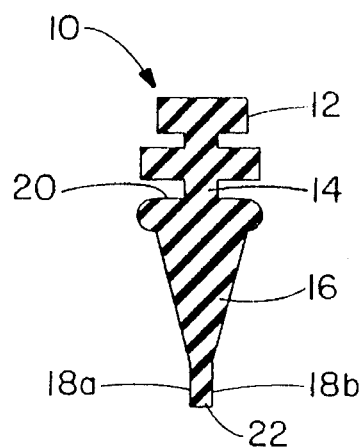
FIG. 1 is an elevation view of a transverse cross section of the wiper blade insert of the prior art.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
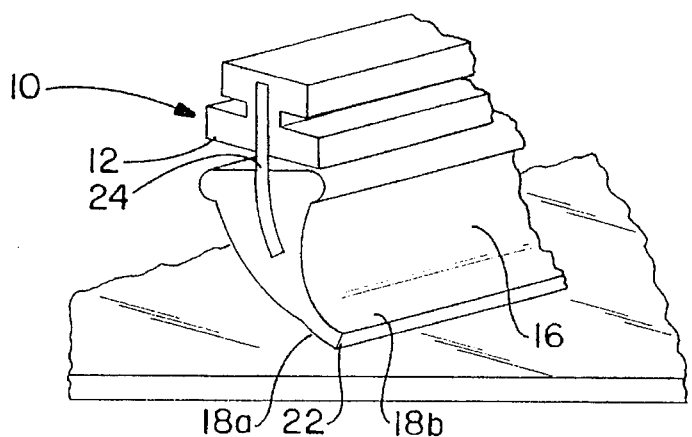
FIG. 2 is a perspective view of the wiper blade insert of the present invention, showing the insert as inserted into the carrier arm and in a flexed configuration during the wiping process.

Reference is first made to FIG. 1, which shows in transverse cross section a wiper blade insert 10 as known generally in the prior art. Since the wiper blade insert 10 is an elongate member that is uniform along its length (as is shown more clearly in FIG. 2, which shows the present invention), the transverse section shown in FIG. 1 could be taken at essentially any point along the length of the wiper blade insert 10. Starting at the top of FIG. 1, the wiper blade insert 10 comprises: a base portion 12 for attaching the wiper blade insert 10 into the wiper blade carrier arm (not illustrated) of the vehicle, a shank or neck portion 14 and a wiping portion 16. In the prior art, the entire wiper blade insert 10 would comprise the same elastomeric material. Because of the differing functions of the three distinct portions of the wiper blade insert 10, the formulation of such an elastomeric material would be adjusted to be an elastomer somewhat optimized for all of the functions, rather than being varied to provide maximum performance for any given function. This is best understood if the function of each of the portions of the wiper blade insert 10 is explained.

The base portion 12 of wiper blade insert 10 is an elongate member with the purpose of providing a means for affixing the wiper blade insert 10 to the wiper blade carrier arm. As shown in FIG. 1, one embodiment of the base portion 12 has a generally "I" shape cross section. The cross section is intended to provide some structural stiffness or rigidity to the insert 10, as well as to accommodate the wiper blade carrier arm in which the base portion 12 of insert 10 is inserted. There is little or no requirement of elastic behavior on the base portion 12. The base portion 12 is affixed to the wiping portion 16 by means of neck portion 14 along substantially the entire length of the blade insert 10 and the blade insert 10 is firmly affixed to the carrier arm. While a variety of carrier arm structures are known to exist, the teachings of the present invention are equally applicable to virtually every conventional windshield wiper carrier arm with only minor dimensional modifications being required, just as the wiper blade inserts 10 of the prior art are commonly interchangeable, the major variable being length. Wiper blades inserts generally vary from about 16 to about 20 inches in length, depending upon the model of vehicle with which they are used. Although conventional teaching is to manufacture the base portion 12 from an elastomeric material consistent with the remainder of the wiper blade 10, it is clear that no need for an elastomer exists for functional purposes, and a rigid material would function at least as well.

The shank or neck portion 14 of the prior art wiper blade insert 10 is a narrow elongate strip intended to allow the base portion 12 to be connected to the wiping portion 16 along substantially the entire length of the blade insert 10. The shank portion 14 is a member capable of causing the wiping portion 16 to swing relative to the base portion 12 so that a first wiping surface 18a is in contact with the windshield when the blade 10 is moved in a first direction across the windshield and a second wiping surface 18b is in contact with the windshield when the blade is moved in the opposite direction. In order to allow such changing contact, the shank portion will adopt a first angular set when the first wiping surface 18a is in contact and a second angular set (typically equal in magnitude but opposite in direction from the first angular set relative to an unflexed shank portion) when the second wiping surface 18b is in contact. The change from the first angular set to the second angular set (or vice versa) must occur quickly at the point at which the direction of the wiper reverses its direction. Failure to do so will result in poor performance in at least one of the wiping directions. When unstressed, the shank portion 14 acts as a spring hinge to hold the wiping portion 16 perpendicular to the carrier arm. The shank portion 14 is, however, rarely unstressed. The pressure exerted by the carrier arm against the windshield is generally sufficient to cause the shank portion 14 to adopt either the first or second angular set. In an ideal situation, the shank portion 14 will not permanently adopt such an angular set that would result in a poor wipe. The preferred material for the neck portion 14 would be a material that is substantially elastic, has a high elastic modulus, and will not adopt a permanent set.

The wiping portion 16 of the prior art has substantially a trigonal cross section. The upper surface 20 of the wiping portion 16 makes continuous lengthwise contact with the base portion 12 by way of the shank portion 14. As already indicated, the wiping portion 16 has first and second wiping surfaces, 18a and 18b, respectively, positioned on the other two edges of the trigonal cross section.

The lip portion 22 is a thin plate-like protruded portion attached at the apex of the trigonal cross section opposite upper surface 20 of the wiping portion 16. The lip portion 22 is constituted such that the respective sides thereof, 18a and 18b, respectively, are in direct contact with the windshield. It is the lip portion 22 that must "flip" at the end of each wiping cycle so that the active wiping surface is changed from surface 18a to 18b or vice versa.

In the present invention, the shank portion 14 incorporates a metal that is different from the rubber used for the base portion 12 or the wiping portion 16. Several methods are available to do this, as shown more specifically in FIGS. 3–7. The shank portion 14 comprises a material possessing a resistance to set and an elastic memory that is unaffected by the service conditions encountered by a wiper blade insert. Particularly important among these service conditions is the wide range of temperatures encountered, which may go from −30° C. to +130° C.

Several materials were tested, including commercially available wiper blade inserts, for 96 hours at 70° C. to determine their ability to resist permanent set and maintain their elastic response rate. The test consisted of deflecting the material at 45 degrees from the undeflected state, and then measuring the permanent set achieved. A specimen acquiring no permanent set would give a permanent set of 0 degrees; a material that completely adopts the set of deflected state would give a permanent set of 45 degrees. The test results are summarized as follows:

TABLE 1

| MATERIAL | PERMANENT SET (degrees) |
| --- | --- |
| Commercial all rubber wiper blade I | 11 |
| Commercial all rubber wiper blade II | 15 |
| Polyester | 19 |
| Polycarbonate (LEXAN) | 16.5 |
| Spring (Stainless steel) | 0.7 |
| Beryllium copper | 0 |
| Blue carbon steel | 0 |

As the test results clearly show, the substitution of the spring grade metal for the soft flexible rubber eliminates the problems of permanent set and loss of the elastic response. Just as clearly, the standard rubber commercially used in wiper blades appears to be preferable to some polymers, especially polyester or polycarbonate.

The above discussion indicates a desire for an elastic modulus that is higher than that of natural rubber. The elastic response frequency is defined as being directly proportional to the square root of the ratio of the spring constant of the material divided by the mass of the object. Since the masses of a rubber or metal are essentially identical, particularly when a thinner metal shank is utilized, the elastic response frequency ratio of a metal shank to a rubber shank will be closely related to the ratio of the square roots of the spring constants. Metals that have a higher spring constant than rubber and resist permanent set are the preferred metals for the present invention. Particular preference is for metals such that the elastic response frequency exceeds that of rubber by at least twenty percent.

Figure 3:
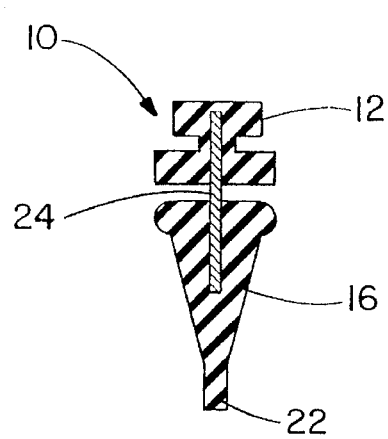
FIG. 3 is an elevation view of a transverse cross section of a first embodiment of the present invention wiper blade insert.
Figure 4:
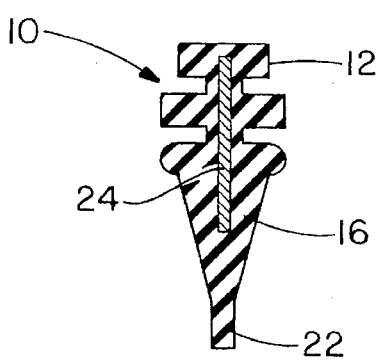
FIG. 4 is an elevation view of a transverse cross section of a second embodiment of the present invention wiper blade insert.
Figure 5:
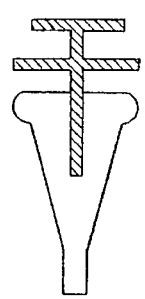
FIG. 5 is an elevation view of a transverse cross section of a third embodiment of the present invention wiper blade insert.
Figure 6:
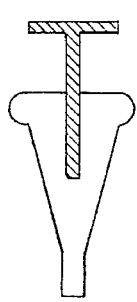
FIG. 6 is an elevation view of a transverse cross section of a fourth embodiment of the present invention wiper blade insert.
Figure 7:
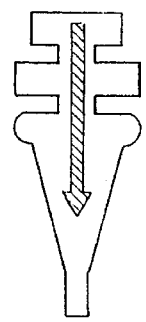
FIG. 7 is an elevation view of a transverse cross section of a fifth embodiment of the present invention wiper blade insert.

FIGS. 3 through 7 illustrate various embodiments of the present invention wherein at least a portion of the rubber material of the shank portion 14 of the wiper blade insert 10 as known in the prior art is replaced by a metal shank portion 24. Specifically, FIG. 3 shows a first embodiment wherein the entire rubber shank portion 14 is replaced by the metal shank portion 24 so that the neck portion 24 is exposed whenever it is not embedded into the base portion 12 or the wiping portion 16 along its length. FIG. 4 shows a second embodiment wherein the metal shank portion 24 is covered entirely by the same rubber comprising the base and wiping portions, 12 and 16 respectively. FIG. 5 shows a third embodiment wherein the entire rubber base portion 12 and shank portion 14 are replaced by the metal shank portion 26. In this manner, the elastic properties of the shank portion 26 may be realized also in the base portion of the wiper blade. FIG. 6 shows the same sort of wiper blade as in FIG. 5, but with a slightly different method of attaching the base portion to the wiper blade. FIG. 7 shows a further embodiment wherein the metal shank portion 26 has been adapted at the first end 28 and the second end 30 to assist in anchoring it into the base portion 12 and the wiping portion 16, respectively.

Because the flexural modulus of rigidity of the metal materials is much higher than that of the prior art rubber, the shank portion required by the present invention will be of much thinner gauge than the prior art neck portion 14. The ratio of thicknesses involved will be approximately proportional to the inverse of the ratio of the flexural moduli of the materials involved.

In selecting the metal insert to enhance the elastic response of the shank portion, one suitable metal is a spring metal, particularly a spring stainless steel. In one embodiment of the present invention, the preferred elastic response member to be used in the shank portion is an elongate rectangular metal solid with a thickness in the range of about 0.001 to about 0.004 inches and a width in the range of about 0.20 to about 0.25 inches. A particularly preferred metal would be selected from the group consisting of spring stainless steel, blue carbon steel, beryllium copper, monel, phosphor bronze, silicon bronze and spring grade brass, with a Rockwell hardness in the range of about 45 to about 55. In a wiper blade insert utilizing a rectangular strip of spring metal, it is possible to use any of the embodiments shown in the Figures, since the solid nature of the strip metal provide sufficient structural integrity. Therefore, the metal strip may be exposed or it may be embedded in a rubber matrix.

Figure 8:
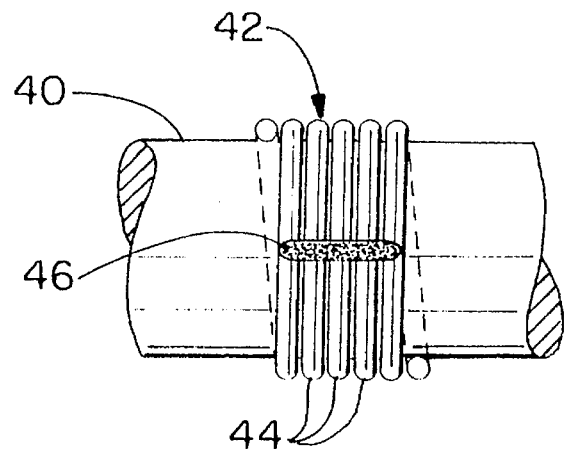
FIG. 8 is an enlarged elevation view of the method of forming a first species of the second embodiment of the elastic response member of the present invention.
Figure 9:
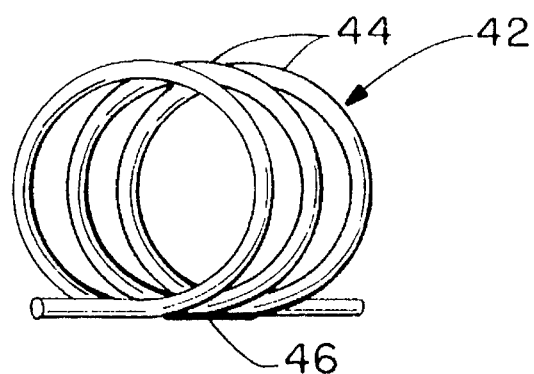
FIG. 9 is an enlarged elevation view of the first species of the second embodiment of the elastic response member of the present invention.

In another embodiment of the present invention, the elastic response member in the shank portion is formed from metal wire, preferably where the wire is a metal selected from the group consisting of stainless steel, blue carbon steel, beryllium copper, monel, phosphor bronze, silicon bronze and spring grade brass, with a Rockwell hardness in the range of about 45 to about 55. The wire selected would have a diameter in the range of about 0.001 to about 0.006 inches. In one species of this embodiment, the elastic response member is formed by wrapping a length of the selected wire around a mandrel 40 to form a tight helical coil 42 of adjacent circular loops 44, as shown in an enlarged partial elevational view in FIG. 8. Before removing the coil 42 from the mandrel 40, it is necessary to securing the adjacent loops 44 of the coil so that they do not separate. A preferred method of doing this is to make an axial weld 46 along the coil 42, so that the adjacent loops are retained at the point of the weld. When the mandrel 40 is then removed, the coil 42 may be axially flattened in a manner that is reminiscent of a deck of cards spread out atop each other, to present the elastic response member to be used in the shank portion. In such a flattened version, the axial weld will reside along the edge of the flattened coil, as shown in FIG. 9, which is an enlarged partial elevation view. When so flattened the coil should provide an essentially rectangular member with a width of about 0.20 to about 0.25 inches and a thickness in the range of about 0.002 to about 0.028 inches. For that reason, the mandrel used for forming the coil is preferred to be about 0.20 to about 0.022 inches in diameter.

Since this elastic response member is not actually a solid, contains significant open space, and has a weld that could present an opportunity for corrosion and the like, the elastic response member of this species of the second embodiment should be embedded in a matrix of natural rubber. The preferred method of doing this is to embed the member in uncured rubber latex before the curing process. Therefore, the use of this species of this embodiment would be limited to that shown in FIG. 4.

Figure 10:
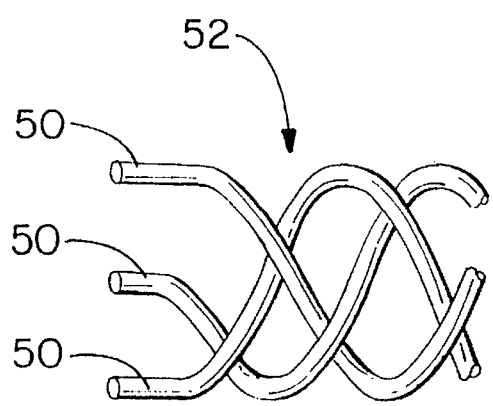
FIG. 10 is an enlarged elevation view of a second species of the second embodiment of the elastic response member of the present invention.

In a second species of the second embodiment, as shown in FIG. 10, the elastic response member is formed by braiding at least three lengths of the preferred spring wire 50 to form a flat elongate ribbon 52. In the preferred version of this species, the flat elongate ribbon of braided wire has a width in the range of about 0.20 to about 0.25 inches and a thickness in the range of about 0.002 to about .028 inches. As with the other species of this second embodiment, this elastic response member is not actually a solid and contains significant open space. It also has wire strands which, if broken, could present a significant scratching hazard to the windshield. Therefore, the elastic response member of this second species of the second embodiment should be embedded in a matrix of natural rubber. The preferred method of doing this is to embed the member in uncured rubber latex before the curing process. Therefore, the use of this species of this embodiment would be limited to that shown in FIG. 4.

As some automobile windshields are known to be curved and require the wiper blade to conform to that curvature in order to be effective, it is necessary that the wiper blade insert 10 of the present invention to also be able to curve along its length to accommodate the shape of the windshield. While this result is difficult to achieve with the solid metal strip of the first embodiment, the open structures of the two disclosed species of the second embodiment present sufficient lengthwise flexibility to allow the wiper blade insert to adapt itself to the windshield shape.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A wiper blade insert for a wiper blade carrier arm comprises:

a base portion for attaching the wiper blade insert into said wiper blade carrier arm;

a shank portion with a longitudinal axis and a first and a second edge therealong, comprising an elastic response member formed from wire embedded in a matrix of natural rubber to provide said shank portion with an elastic response frequency that is at least 1.2 times faster than that of a shank portion of identical thickness and identical width made of only the identical natural rubber, with the first edge thereof affixed to said base portion; and a tip portion comprising a flexible abrasion resistant vulcanized natural rubber material suitable for wiping, said tip portion attached along the second edge of said shank portion, wherein the elastic response member is formed by wrapping a length of wire around a mandrel to form a tight helical coil, securing adjacent loops of the coil by making an axial weld along the coil, removing the mandrel and flattening the coil axially to provide an essentially rectangular looped member.

2. The wiper blade insert of claim 1 wherein the shank portion retains a permanent set of less than about nine degrees after being deflected to 45 degrees for 96 hours at a temperature of 70° C.

3. The wiper blade insert of claim 1 wherein the shank portion retains a permanent set of less than about five degrees after being deflected to 45 degrees for 96 hours at a temperature of 70° C.

4. The wiper blade insert of claim 1 wherein the shank portion retains a permanent set of less than about one degree after being deflected to 45 degrees for 96 hours at a temperature of 70° C.

5. The wiper blade insert of claim 1 wherein the shank portion has an elastic response frequency that is substantially unaffected by temperature between −30° C. and +130° C.

6. The wiper blade insert according to claim 1 wherein the wire is a metal selected from the group consisting of stainless steel, blue carbon steel, beryllium copper, monel, phosphor bronze, silicon bronze and spring grade brass, with a Rockwell hardness in the range of about 45 to about 55.

7. The wiper blade insert of claim 6 wherein the wire has a diameter in the range of about 0.001 to about 0.006 inches.

8. The wiper blade insert of claim 1 wherein the mandrel used for forming the coil is about 0.20 to about 0.022 inches in diameter.

9. A wiper blade insert for a wiper blade carrier arm comprises:

a base portion for attaching the wiper blade insert into said wiper blade carrier arm;

a shank portion with a longitudinal axis and a first and a second edge therealong, comprising an elastic response member formed from wire embedded in a matrix of natural rubber to provide said shank portion with an elastic response frequency that is at least 1.2 times faster than that of a shank portion of identical thickness and identical width made of only the identical natural rubber, with the first edge thereof affixed to said base portion; and a tip portion comprising a flexible abrasion resistant vulcanized natural rubber material suitable for wiping, said tip portion attached along the second edge of said shank portion, wherein the elastic response member is formed by braiding at least three lengths of wire to form a flat elongate ribbon.

10. The wiper blade insert of claim 2 wherein the flat elongate ribbon of braided wire has a width in the range of about 0.20 to about 0.25 inches and a thickness in the range of about 0.002 to about 0.028 inches.

* * * * *